United States Patent
Onoe et al.

(10) Patent No.: US 7,474,659 B2
(45) Date of Patent: Jan. 6, 2009

(54) TRANSMITTER, COMMUNICATION SYSTEM, AND COMMUNICATION METHOD

(75) Inventors: Atsushi Onoe, Kanagawa (JP); Kazumi Sato, Kanagawa (JP); Yasutaka Miwa, Tokyo (JP)

(73) Assignee: Sony Corporation, Tokyo (JP)

( * ) Notice: Subject to any disclaimer, the term of this patent is extended or adjusted under 35 U.S.C. 154(b) by 653 days.

(21) Appl. No.: 11/085,650

(22) Filed: Mar. 21, 2005

(65) Prior Publication Data

US 2005/0163130 A1    Jul. 28, 2005

Related U.S. Application Data

(63) Continuation of application No. 09/686,682, filed on Oct. 11, 2000, now Pat. No. 6,876,626.

(30) Foreign Application Priority Data

Oct. 12, 1999  (JP)  ................................. 11-289504

(51) Int. Cl.
    *H04L 12/28*    (2006.01)
    *H04J 3/22*     (2006.01)
    *H04J 3/16*     (2006.01)
    *G06F 15/173*   (2006.01)

(52) U.S. Cl. .................. 370/395; 370/389; 370/468; 709/226

(58) Field of Classification Search ......... 370/229–352, 370/389–411, 455–468; 709/226–235
See application file for complete search history.

(56) References Cited

U.S. PATENT DOCUMENTS

| | | | |
|---|---|---|---|
| 5,229,992 A | 7/1993 | Jurkevich et al. | |
| 5,579,312 A * | 11/1996 | Regache | 370/397 |
| 5,872,783 A | 2/1999 | Chin | |
| 5,930,259 A | 7/1999 | Katsube et al. | |
| 5,995,487 A * | 11/1999 | Weaver et al. | 370/395.21 |
| 6,046,979 A | 4/2000 | Bauman | |
| 6,151,324 A * | 11/2000 | Belser et al. | 370/397 |
| 6,167,051 A | 12/2000 | Nagami et al. | |
| 6,185,213 B1 | 2/2001 | Katsube et al. | |
| 6,212,162 B1 | 4/2001 | Horlin | |
| 6,222,841 B1 | 4/2001 | Taniguchi | |
| 6,233,240 B1 * | 5/2001 | Barbas et al. | 370/395.62 |
| 6,490,248 B1 | 12/2002 | Shimojo | |
| 6,501,760 B1 | 12/2002 | Ohba et al. | |
| 6,538,989 B1 * | 3/2003 | Carter et al. | 370/229 |
| 6,570,876 B1 * | 5/2003 | Aimoto | 370/389 |
| 6,643,258 B1 | 11/2003 | Ise et al. | |
| 6,680,907 B1 | 1/2004 | Bonaventure | |
| 2002/0080722 A1 | 6/2002 | Uriu et al. | |

* cited by examiner

*Primary Examiner*—M. Phan
(74) *Attorney, Agent, or Firm*—Frommer Lawrence & Haug LLP; William S. Frommer

(57) ABSTRACT

A transmitter, a communication system, and a communication method capable of realizing communication of more than a set bandwidth with respect to a packet communication with a bandwidth guarantee set therefore by using a set bandwidth as the minimum guaranteed bandwidth, wherein when a transmitter transmits packet data, it decides whether or not packet communication guarantees a bandwidth based on a guaranteed bandwidth set in advance, and adds a first identifier to the packet data when guaranteeing bandwidth, and adds a second identifier when not guaranteeing the bandwidth.

1 Claim, 18 Drawing Sheets

PRIOR ART FIG. 1
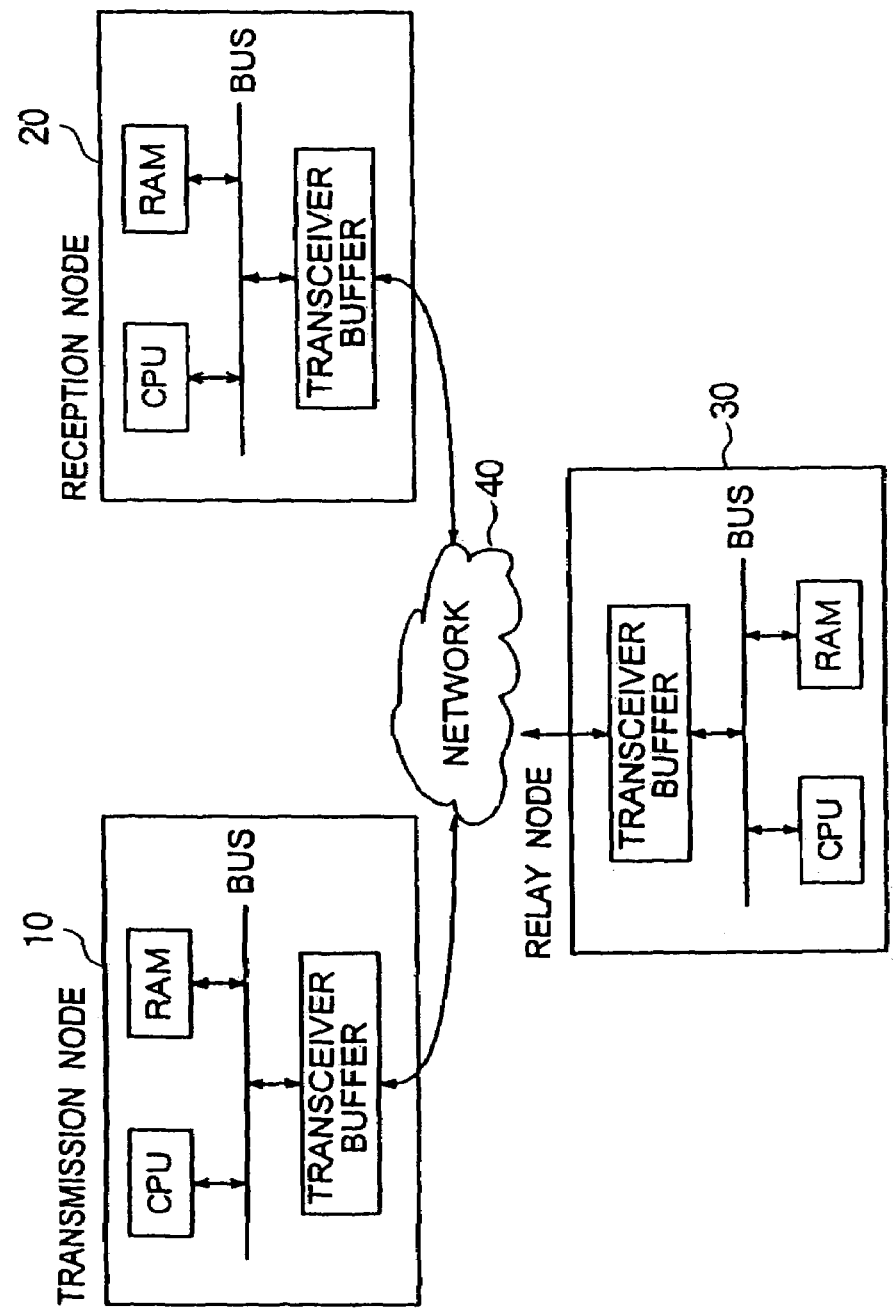

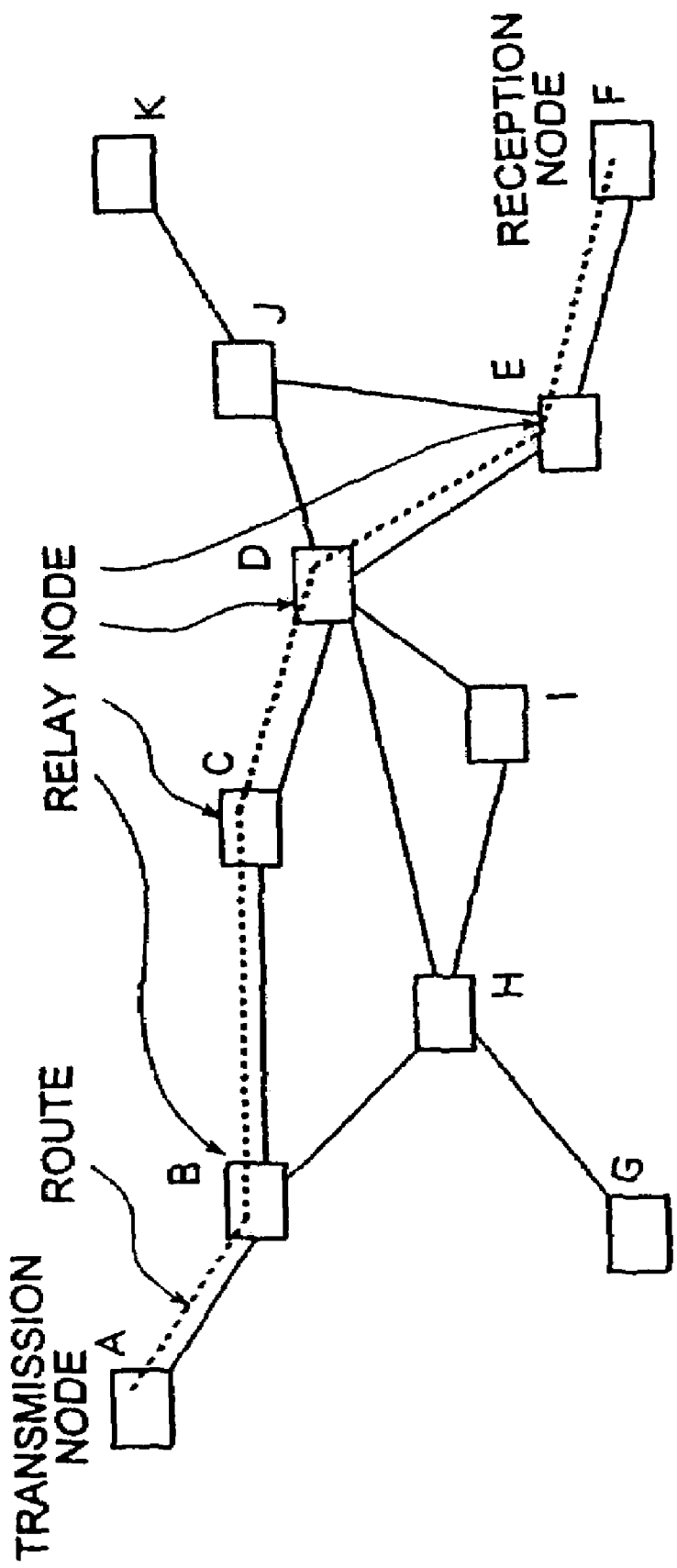
PRIOR ART FIG. 2

PRIOR ART    FIG. 3

| PACKET IDENTIFIER | GUARANTEED BANDWIDTH |
|---|---|
| PA | 100 |
| PB | 150 |
| : |  |
| PY | 120 |
| PZ | 200 |

PRIOR ART FIG. 4A

| 0 | 3 4 | 7 8 | 15 | 16 18 | 19 | 31 | (bit) |

| Version | H Length | TOS | Total Length | | |
|---|---|---|---|---|---|
| identification | | | flags | Fragment Offset | |
| TTL | | Protocol(=TCP) | Header Checksum | | |
| Source IP address | | | | | |
| Destination IP address | | | | | |
| Source Port Number | | | Destination Port Number | | |

IPv4 with TCP

PRIOR ART FIG. 4B

| 0 | 3 4 | 11 12 | 15 16 | 23 24 | 31 | (bit) |

| Version | Class | Flow Label | |
|---|---|---|---|
| Payload Length | | Next Header | Hop Limit |
| Source IP address | | | |
| Destination IP address | | | |
| Source Port Number | | Destination Port Number | |

IPv6 with TCP

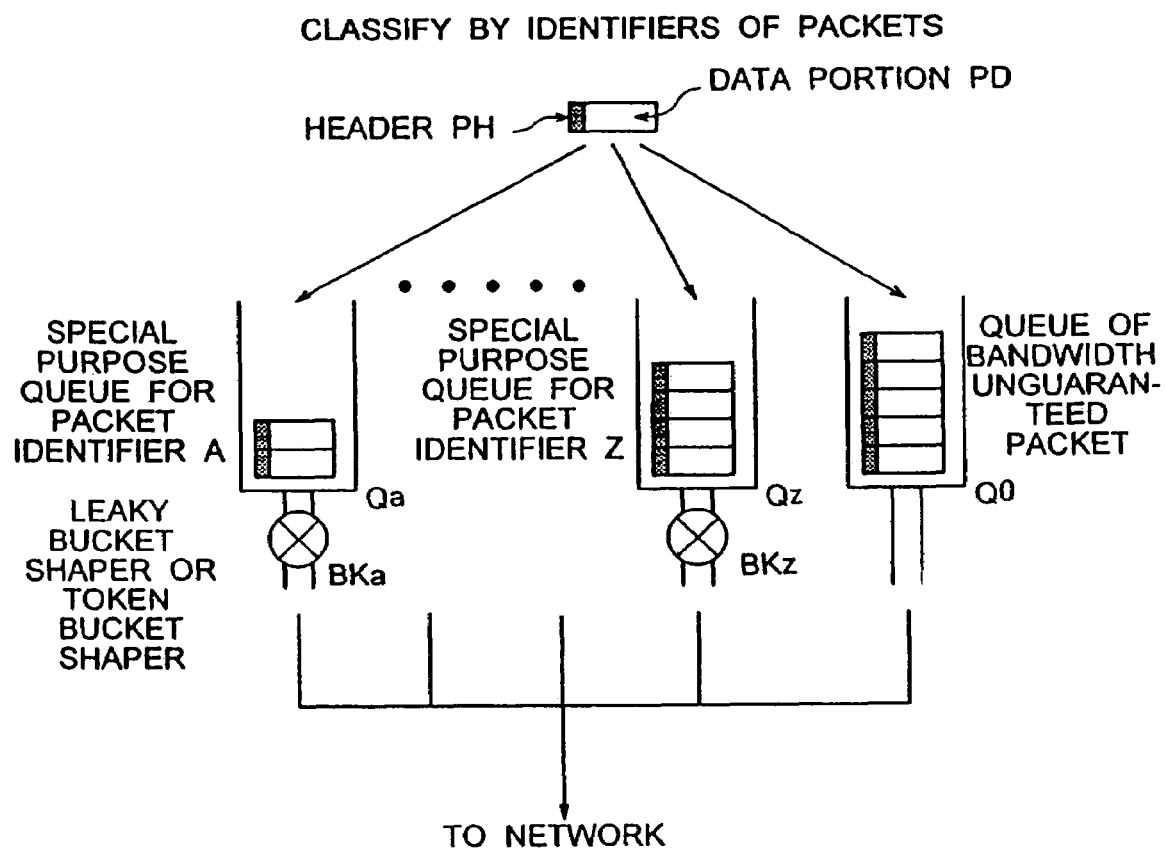
PRIOR ART FIG. 5

PRIOR ART FIG. 6A
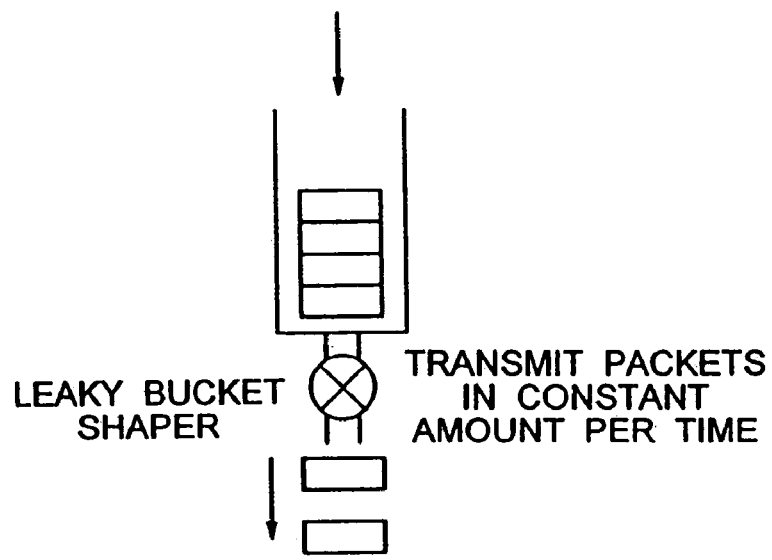
PRIOR ART FIG. 6B
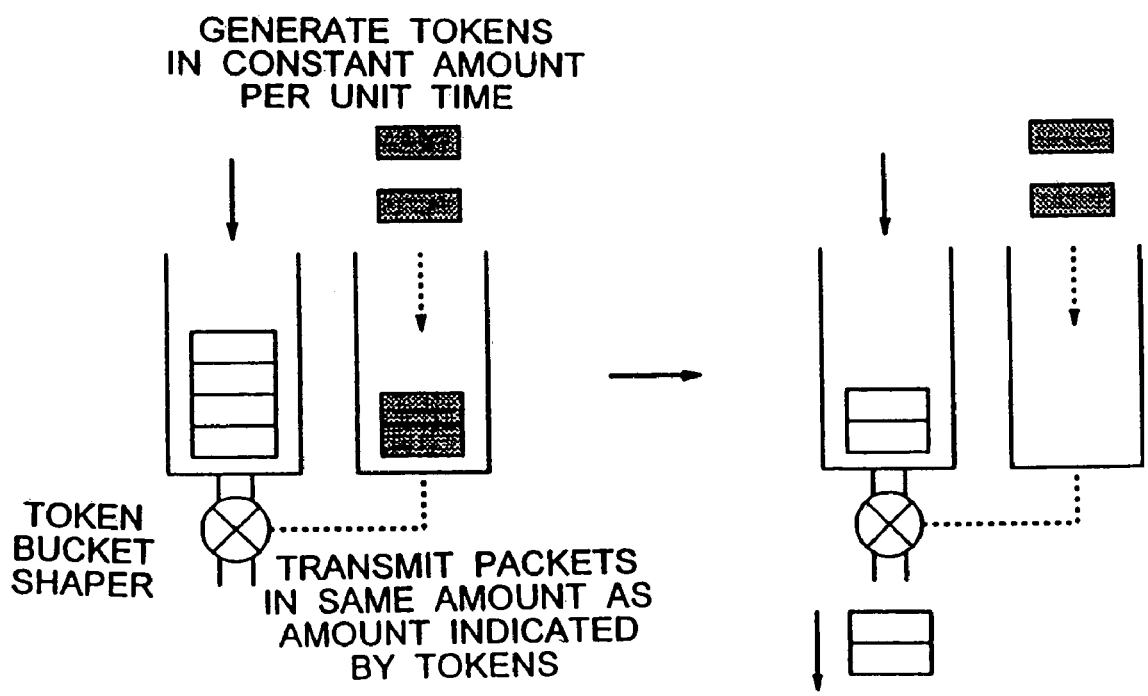

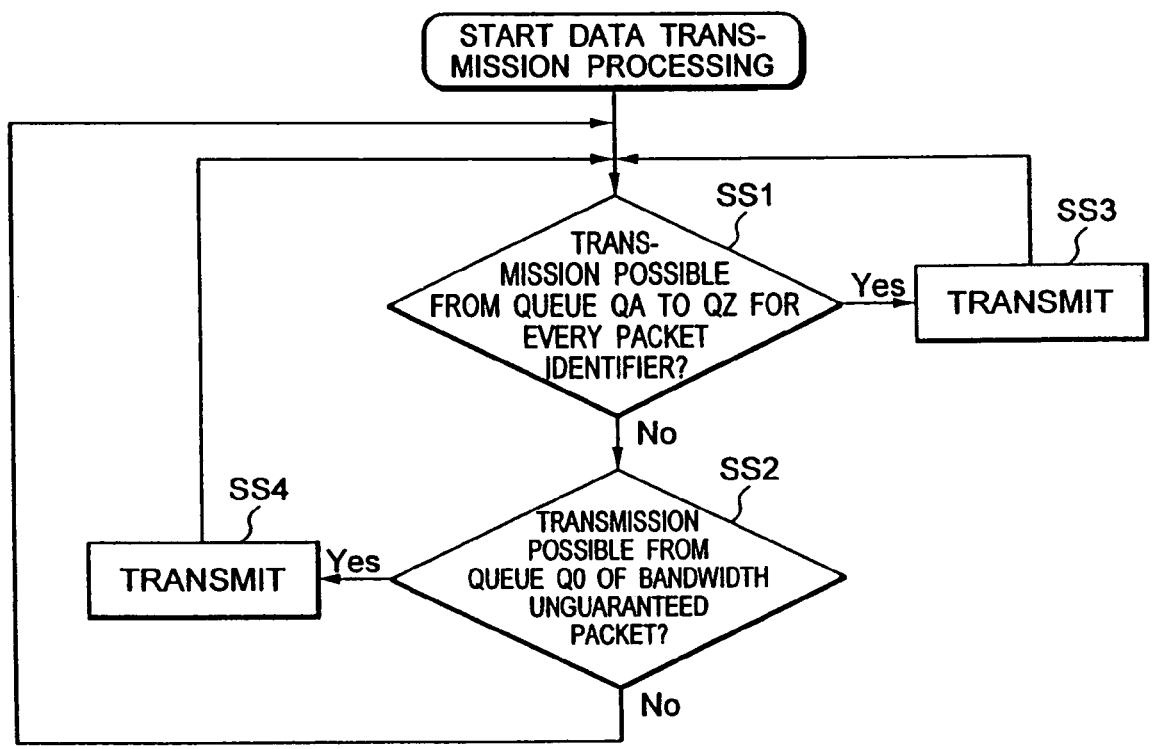
PRIOR ART FIG. 7

PRIOR ART FIG. 8
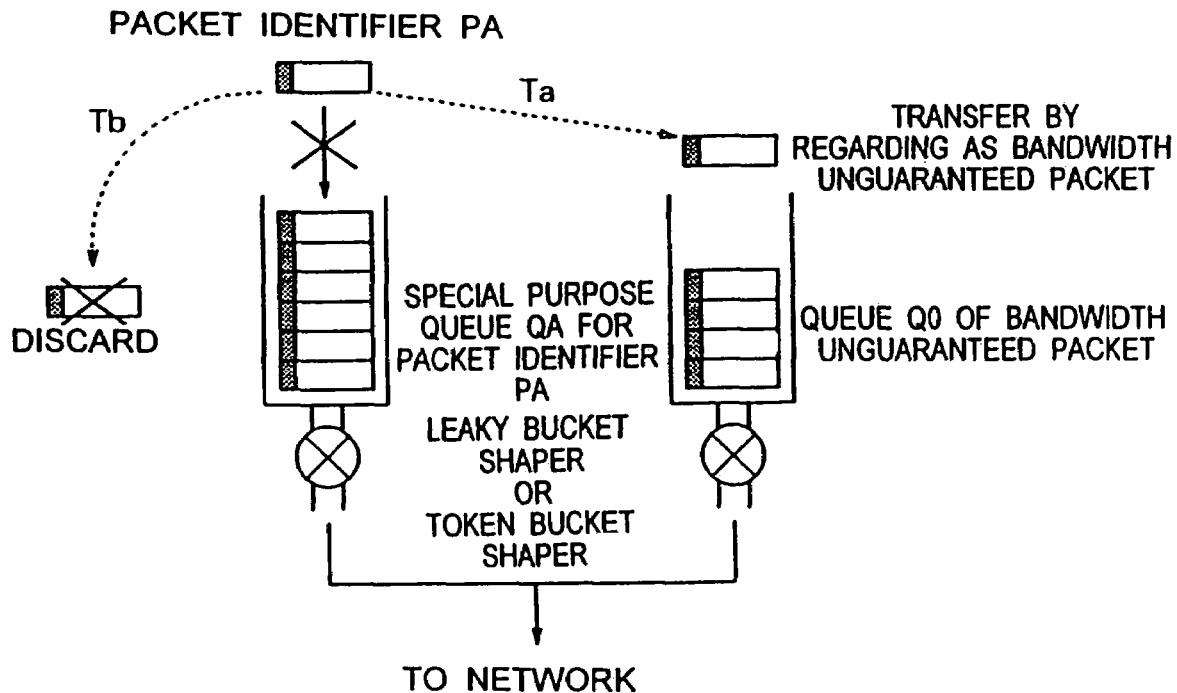
PRIOR ART FIG. 9A
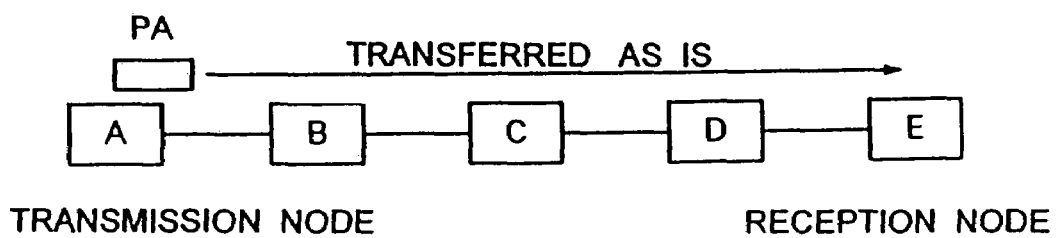
PRIOR ART FIG. 9B
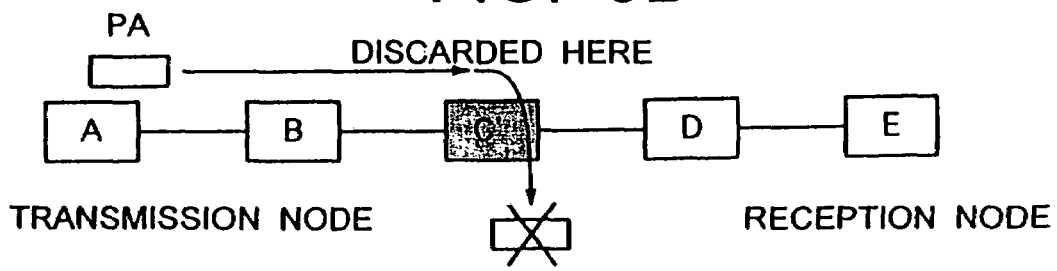

TRANSMITTER, COMMUNICATION SYSTEM, AND COMMUNICATION METHOD

This is a continuation of U.S. application Ser. No. 09/686,682 (now U.S. Pat. No. 6,876,626), filed Oct. 11, 2000, the entirety of which is incorporated herein by reference.

BACKGROUND OF THE INVENTION

1. Field of the Invention

The present invention relates to a transmitter for performing packet communication in a packet network, a communication system, and a communication method of the same.

2. Description of the Related Art

Packet communication is a communication method dividing transfer data into predetermined amounts of data to form packets and transferring the data in units of packets through a network. A "bandwidth guarantee" in packet communication means to transfer the data while maintaining a constant data transfer speed or a constant mean data transfer speed with respect to a certain specific communication (flow).

FIG. 1 shows an example of the configurations of a transmission node 10 for performing conventional packet communication, a reception node 20, a relay node 30, and a network 40 with these nodes commonly connected thereto. As illustrated, the transmission node 10, reception node 20, and the relay node 30 are configured by a central processing unit (CPU), a memory such as a random access memory (RAM), and a transceiver buffer. These components are connected to each other via buses provided at the nodes. The data and control signals are transferred inside the nodes via the buses. Note that the transmission node 10, the reception node 20, and the relay node 30 are configured by host computers connected to the network 40 via for example predetermined interfaces.

In packet communication, the transmission node 10 sends packet communication data (hereinafter, simply described as "packets" for convenience) to the network 40 via the transceiver buffer. The packets transmitted to the network 40 are received by the relay node 30. The related relay node 30 performs predetermined processing, then sends the packets to the network 40 again. The packets transmitted by the relay node 30 are received by the reception node 30. In this way, the packets sent from the transmission node 10 are transferred to the reception node 20 via the network 40. Thus, packet communication can be realized through the network 40. Note that, in the example shown in FIG. 1, there is only one relay node, but it is also possible to perform the packet communication by using a plurality of relay nodes in accordance with the scale of the network 40, the state of connection of the network between the transmission node 10 and the reception node 20, etc.

FIG. 2 is a conceptual view of an example of the packet transfer in a network system including a transmission node A, a reception node F, and a plurality of routers (relay nodes), for example, the routers B to E and routers G to K. Note that, here, when certain packet communication is carried out without strictly identifying the host or the router connected to the network system, the host or the router acting as the data originating side is described as the transmission node, while the destination of the related data transfer is described as the reception node, but any of the routers B to E and routers G to K shown in FIG. 2 can be considered as the transmission node or the reception node.

FIG. 2 shows a case where the data existing at the reception node F serving as the destination is transferred from the transmission A via the router R. As illustrated, the packets transmitted from the transmission node A are transferred to the reception node F via the routers B, C, D, and E. As illustrated, a data transfer route from the transmission node A via the routers B, C, D, and E to the reception node F is described as the router R. In FIG. 2, the routers B, C, D, and E are relay nodes.

The transfer route where the packets existing on the network are transferred is determined by a communication protocol. The communication protocol is presently being developed basically around for example a transmission control protocol/Internet protocol (TCP/IP) widely utilized in for example a network system such as a local area network (LAN). The TCP/IP protocol is a so-called network architecture—a term generally referring the network model, the hierarchy model, and plurality of protocol groups.

The work of determining the transfer route when a certain packet communication is carried out by the communication protocol is referred to as "routing". A table indicating identifiers and guaranteed bandwidths of the packets transferred to the relay nodes and transmission and reception nodes selected by the routing is delivered.

FIG. 3 shows an example of the table. As illustrated, this table stores packet identifiers for identifying the packets to be transferred and the guaranteed bandwidths corresponding to the packet identifiers. Here, for example, a packet indicated by a packet identifier PA has to have a bandwidth guarantee of 100, while a packet indicated by a packet identifier PB has to have a bandwidth guarantee of 150. Note that, here, it is assumed that the bandwidth is represented by a bit rate of data transfer, that is, a transfer speed of the data. As an example thereof, a transfer speed of 100 bps is represented by data 100, and the guaranteed bandwidths of the packets can be represented by numerals proportional to that. Each relay node identifies the packet to be transferred by the packet identifier and performs the packet communication in the guaranteed bandwidth requested with respect to that packet, that is, at a requested transfer speed.

A packet identifier is comprised by the minimum information sufficient and required for identifying the packets. For example, in a network employing the TCP/IP protocol, the packet identifier is comprised by a combination of part or all of the IP addresses on the transmitter side and the receiver side, a protocol number, transmission and reception port numbers, and other fields (indicated in the packet header).

FIGS. 4A and 4B show examples of packet headers in a network employing a TCP/IP protocol. As shown in FIG. 4A, the packet header in the IPv4 of the TCP protocol contains, other than information such as a version information (Version) and a header length (H length), information such as a transmitter side IP address (Source IP address), a receiver side IP address (Destination IP address), a transmission port number (Source Port Number), and a reception port number (Destination Port Number). In this case, the transmitter side IP address, receiver side IP address, transmission port number, and the reception port number comprise the packet identifier. Further, it is also possible to add information such as the protocol number into the packet identifier according to need.

FIG. 4B shows a packet header in the IPv6 of the TCP protocol. As illustrated, the packet header contains, other than the version information and a class information (Class), the transmitter side IP address, receiver side IP address, transmission port number, and the reception port number. In this case, the packet identifier can be comprised by the transmitter side IP address, receiver side IP address, transmission port number, and the reception port number. Further, it is also possible to add information such as the protocol number into the packet identifier according to need.

The packet header is usually added to a packet to be transmitted by the transmitter side host and transmitted to the network together with the data portion of the packet. Then, at the time of packet communication, each relay node detects the packet identifier from the packet header added to each packet, decides whether or not the related packet is guaranteed in bandwidth by that, and transfers the related packet in a bandwidth set in the table of the packet identifiers and guaranteed bandwidths shown in FIG. 3, that is, at a certain constant transfer speed in the case of the bandwidth guaranteed packet.

In the router with the bandwidth guarantee set with respect to certain communication, for example, a private queue is assigned for every set identifier. FIG. 5 is a conceptual view of the special purpose queue set for every packet identifier. As illustrated, each packet contains, other than a packet header PH, the packet data portion PD to be actually transferred. The packet identifier is comprised by a combination of some information among a plurality of information existing in the packet header PH.

In the illustrated router, for example, a special purpose queue Qa is prepared for a packet indicated by the packet identifier PA, a special purpose queue Qb is prepared for a packet indicated by the packet identifier B, and a special purpose queue Qz is prepared for a packet indicated by the packet identifier Z.

Further, other than these special purpose queues, a queue Q0 is prepared for the bandwidth unguaranteed packet. Note that, each queue contains for example a buffer for temporarily holding the packet data.

The special purpose queues Qa to Qz prepared for the bandwidth guaranteed packets transmit the packets via packets BKa, . . . , and BKz to the network. On the other hand, the queue Q0 prepared for the bandwidth unguaranteed packet transfers the packets directly to the network without going through those shapers. Here, the packets provided in the special purpose queues are comprised by either of leaky bucket shapers or token bucket shapers.

FIGS. 6A and 6B are conceptual views of a leaky bucket shaper and a token bucket. Both of the leaky bucket shaper and the token bucket shaper play the role of "valves" for controlling the amount of the packet data to be sent out from the queue to the network. Note, in each packet, the method for controlling the amount of the sent data is different. As shown in FIG. 6A, a leaky bucket shaper is for sending out a constant amount of packet data per unit time. Contrary to this, as shown in FIG. 6B, a token bucket shaper is a mechanism for generating a constant amount of tokens per unit time and sending out packet data in an amount similar to the amount indicated by the generated tokens to the network. Namely, by adjusting the opening degrees of the "valves" in accordance with the token amount, the amount of the transmission data to the network is controlled.

As mentioned above, in packet communication, in the nodes set with a bandwidth guarantee among the relay nodes, special purpose queues are prepared for the packets indicated by the identifiers. Then, the packet identifier is extracted from the packet header of the transmission packet, and the queue to be used is determined in accordance with that. At the time of packet transmission, the transfer speed of the packet is controlled with respect to each queue matched with the set bandwidth by using the leaky bucket shaper or the token bucket shaper, and the packet transfer is carried out with a higher priority in comparison with the bandwidth unguaranteed packets.

FIG. 7 is a flowchart of the flow of packet transmission processing. Below, an explanation will be made of an operation of the packet transmission processing by referring to drawings.

As illustrated, first, at step SS1, it is judged if transmission is possible from the queue Qa to Qz prepared for every packet. If transmission is possible, transmission is carried out by that queue (SS3). On the other hand, if transmission is impossible, the routine proceeds to step SS2, where it is judged if transmission is possible from the queue Q0 of the bandwidth unguaranteed packet. If transmission is possible, data is transmitted by the queue Q0 (SS4). If transmission is impossible, the routine returns to step SS1, where the above processing is repeated.

In a network system provided with the above routers, the bandwidth requested for certain communication is guaranteed. As a result, it becomes possible to transfer the data from the transmission node via the network to the reception node in the bandwidth set by the predetermined packet in advance, for example, at the transfer speed.

Summarizing the problem to be solved by the invention, in a network having the above conventional router, when a packet transfer is tried in a bandwidth exceeding the set bandwidth, there is a possibility that the transfer of that packet will no longer be able to be normally carried out.

Here, a case where communication of more than the set bandwidth is carried out by regarding the set bandwidth as the minimum guaranteed bandwidth will be considered. Usually, when packet communication on the network is carried out, in order to actively use resources of the network to the highest limit, a so-called best effort for raising the transfer speed of the packets as much as possible has been made.

Concerning the packet transfer in the set bandwidth, the transfer is carried out with a high priority in comparison with the bandwidth unguaranteed packets, but when it is intended to perform packet transfer that exceeds the set bandwidth, that is, where there are no longer any vacancies in the corresponding queue provided with respect to the identifier of that communication, in that router, either of two professing shown in FIG. 8 is taken.

First, in the processing Ta shown in FIG. 8, the packet transfer is carried out at a transfer speed more than the set bandwidth so far as there is an vacancy bandwidth. Namely, the transfer is carried out while regarding that packet as a bandwidth unguaranteed packet. Next, as the processing Tb shown in FIG. 8, the transfer is not carried out at the transfer speed more than the set bandwidth. In this case, that packet is discarded.

Each router on the network takes either of the processing Ta or Tb shown in FIG. 8. FIGS. 9A and 9B show the fact that different results arise in the transfer of a certain packet PA according to the routers taking the professing Ta and Tb.

For example, as shown in FIG. 9A, the packet PA sent from the transmission node A passes through the relay nodes B, C, and D and transferred to the reception node E. Here, it is assumed that the relay nodes B, C, and D all perform the processing Ta shown in FIG. 8. In this case, as illustrated, in the routers B, C, and D, so far as there is an vacancy bandwidth for communication set with the bandwidth guarantee, a bandwidth more than the set bandwidth can be utilized. The transfer capability of the routers B, C, and D is sufficiently actively used, thus high speed packet communication can be realized.

On the other hand, when performing the processing Tb shown in FIG. 8 in one or more routers among the relay nodes from the transmission node A to the reception node E, packet communication cannot be normally carried out. As shown in FIG. 9B, the packet PA sent from the transmission node A is transferred to the reception node E through the relay nodes B, C', and D. Here, if it is assumed that the relay node C' is the router for performing the processing Tb shown in FIG. 8, when the packet PA is transferred in the bandwidth more than the set bandwidth and arrives at the relay node C', the related relay node C' does not perform the communication in the bandwidth more than the set bandwidth, and the packet PA is discarded here after all. Namely, even if there is one relay node performing the processing Tb shown in FIG. 8 among a plurality of relay nodes, in communication set with a bandwidth guarantee, the bandwidth more than the set bandwidth can not be utilized, the resources of the network cannot be effectively actively used, and, in addition, there is an apprehension that the packet to be transferred will be discarded in the middle and cannot be normally transferred to the receiver side.

SUMMARY OF THE INVENTION

An object of the present invention is to provide a transmitter, a communication system, and a communication method of the same capable of realizing communication more than a set bandwidth using the set bandwidth as the minimum guaranteed bandwidth for communication set with a bandwidth guarantee no matter what processing performed by a relay node on a route for packet transfer that exceeds the set bandwidth.

To attain the above object, according to a first aspect of the present invention, there is provided a transmitter for transferring packet data to a receiver side via a network, having an identifier adding means for deciding whether or not the packet data is transmitted exceeding a guaranteed bandwidth based on the guaranteed bandwidth set in advance with respect to the transfer of the packet data and, in accordance with the result of the related decision, adding a first identifier to the packet data when the packet data is transmitted without exceeding the guaranteed bandwidth, while adding a second identifier to the packet data when the packet data is transmitted exceeding the guaranteed bandwidth, and a transmitting means for transmitting the packet data to which the identifier has been added to the network.

According to a second aspect of the present invention, there is provided a communication system for transferring packet data from a transmitter side to a receiver side via a network, having, on the transmitter side, an identifier adding means for deciding whether or not packet data is transmitted exceeding a set guaranteed bandwidth based on a guaranteed bandwidth set in advance with respect to the packet data to be transferred and, in accordance with the result of the related decision, adding a first identifier to the packet data when the packet data is transmitted without exceeding the guaranteed bandwidth, while adding a second identifier to the packet data when the packet data is transmitted exceeding the guaranteed bandwidth, and a transmitting means for transmitting the packet data to which the identifier has been added to the network.

Further, in the present invention, preferably when there is one flow between the transmitter side and the receiver side, the identifier contains an IP address of the transmitter side, an IP address of the receiver side, a port number of the transmitter side, a port number of the receiver side, and an additional information indicating whether or not a bandwidth guarantee is to be set. When there is a plurality of flows between the transmitter side and the receiver side, the identifier contains the IP address on the transmitter side, the IP address on the receiver side, the port number on the transmitter side, and the port number on the receiver side.

Further, in the present invention, preferably a plurality of receivers are provided on the receiver side, the same multicast IP address is assigned to each receiver, and, when multicast communication is carried out from the transmitter side with respect to the plurality of receivers, the identifier contains the IP address on the transmitter side, the multi-cast IP address on the receiver side, the port number on the transmitter side, and the port number on the receiver side.

Further, in the present invention, preferably the transmitting means has a token bucket shaper and transmits the data to the network in the set guaranteed bandwidth by using the token bucket shaper for the packet data to be transmitted without exceeding the set bandwidth. Further, the token bucket has a token generating means for generating a token in accordance with the set guaranteed bandwidth.

Further, in the present invention, preferably, provision is made of a relay unit for receiving packet data transferred via the network and further transferring the received packet data to the receiver side, the relay unit has a receiving means for receiving the packet data from the network, an identifier adding means for deciding whether or not the packet data received by the receiving means has been transmitted exceeding the guaranteed bandwidth set in advance, and, in accordance with the result of the related decision, adding a first identifier to the packet data when the packet data is transmitted without exceeding the guaranteed bandwidth, while adding a second identifier to the packet data when the packet data is transmitted exceeding the guaranteed bandwidth, and a transmitting means for transmitting the packet data to which the identifier has been added to the network.

Further, in the present invention, preferably, between the transmitter side and receiver side, provision is made of a router setting means for selecting one or more relay units and provision is further made of a registering means for registering identifiers corresponding to packet data to be transferred without exceeding the set guaranteed bandwidth and guaranteed bandwidths thereof.

Further, in the present invention, preferably provision is made of a delivering means for delivering the identifiers and the guaranteed bandwidths registered by the registering means to the transmitter side, a relay unit selected by the router setting means, and the receiver side.

According to a third aspect of the present invention, provision is made of a communication method of a communication system for transferring packet data from a transmitter side to a receiver side via a network, comprising a step of deciding whether or not the packet data is transmitted exceeding a guaranteed bandwidth based on a guaranteed bandwidth set in advance with respect to the transfer of the packet data, a step of adding a first identifier to the packet data when the packet data is transmitted without exceeding the guaranteed bandwidth in accordance with the result of the decision, while adding a second identifier to the packet data when the packet data is transmitted exceeding the guaranteed bandwidth, and a step of transmitting the packet data to which the identifier has been added to the network.

According to the present invention, when the packet data is transmitted at the transmitter, it is decided whether or not the packet communication is bandwidth guaranteed based on the guaranteed bandwidth set in advance and, in accordance with the result of the related decision, when the bandwidth is guaranteed, the first identifier is added to the packet data, while, when the bandwidth is not guaranteed, the second identifier is added to the packet data and transmitted to the network.

In the relay unit connected to the network, in accordance with the identifiers registered in advance and the guaranteed bandwidths corresponding to them, it is decided whether or not the received packet data is bandwidth guaranteed, the first or second identifier is added to the packet data in accordance with the result of the decision, and further the data is transmitted to the next relay unit or receiver side via the network.

By adding different types of identifiers to the packet data in accordance with whether or not the bandwidth is guaranteed, the relay unit does not transmit data in a bandwidth more than the set bandwidth with respect to the packet data to which the first identifier indicating the bandwidth guarantee is added and can prevent discarding of the packet data. Further, since the second identifier is added to packet data transmitted exceeding the set bandwidth, this packet data is transferred as a not bandwidth guaranteed packet. Due to this, the set minimum bandwidth guarantee can be realized, further resources of the network can be sufficiently actively used, and packet communication more than the set bandwidth can be realized.

BRIEF DESCRIPTION OF THE DRAWINGS

These and other objects and features of the present invention will become more apparent from the following description of the preferred embodiments given with respect to the attached drawings, wherein:

FIG. 1 is an example of the configuration of a transmission node, a reception node, a relay node, and a network with these nodes commonly connected thereto;

FIG. 2 is a view of an example of a communication system for performing a packet transfer from the transmission node via a plurality of relay nodes to a reception node;

FIG. 3 is a view of a table containing packet identifiers and guaranteed bandwidth information;

FIG. 4 is a view of a structure of a packet header in a network employing a TCP/IP protocol;

FIG. 5 is a conceptual view of a special purpose queue set for every packet identifier;

FIG. 6 is a conceptual view of a leaky bucket shaper and a token bucket shaper;

FIG. 7 is a flowchart of a flow of packet transmission processing;

FIG. 8 is a view of processing in a route performing packet transfer that exceeds the set bandwidth;

FIG. 9 is a view of different results of a packet transfer according to routers performing two types of processing;

DESCRIPTION OF THE PREFERRED EMBODIMENTS

First Embodiment

Figure 10:
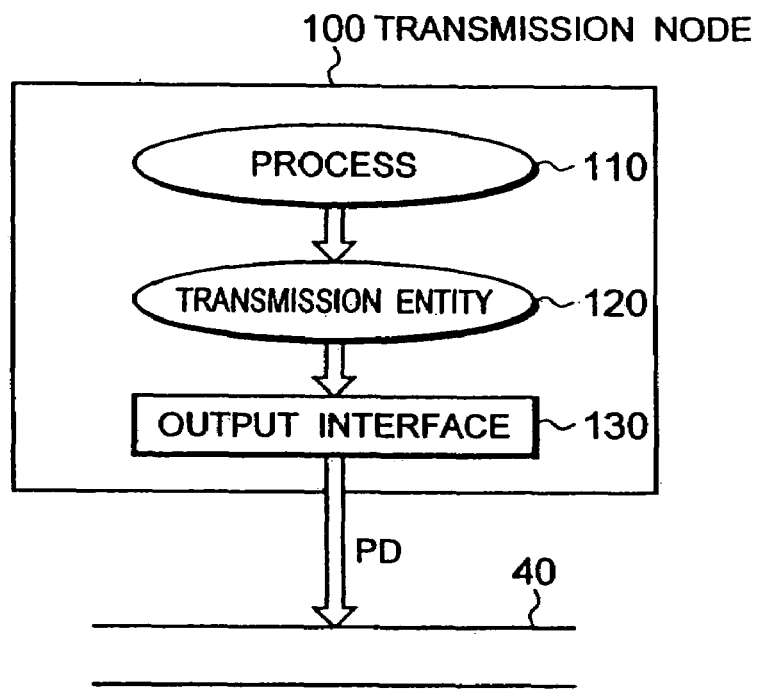
FIG. 10 is a view of the configuration of an example of a transmission node serving as a transmitter according to the present invention.

FIG. 10 is a view of the configuration of an embodiment of a transmitter according to the present invention. As illustrated, a transmitter 100 of the present embodiment includes a process 110, a transmission entity 120, and an output interface 130.

The transmitter 100 receives as input transmission data generated by the process 110 at the output interface 130 by the transmission entity 120. The output interface 130 generates the packet PD and transmits this to the network 40. The transmitted packet PD is transferred to for example a reception node through one or a plurality of routers connected to the network 40. Namely, the transmitter 100 shown in FIG. 10 corresponds to for example the transmission node shown in FIG. 2.

When the transmission data is generated by the process 110, the transmitter 100 determines the transfer route by the transmission entity 120 based on attribute information of the transmission data, for example, information of whether or not the bandwidth is guaranteed, the IP address of the reception node, and the reception port number. Then, the packet PD is formed from the transmission data, and the packet header is added to each packet and output via the output interface 130 to the network 40.

Figure 11:
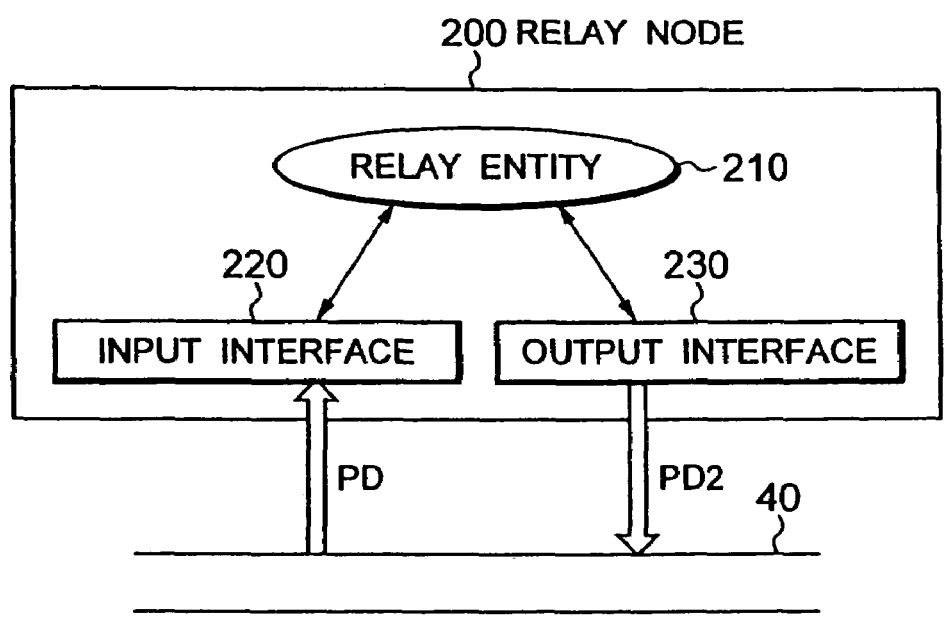
FIG. 11 is a view of the configuration of an example of a relay node according to the present invention.

Note that, FIG. 10 shows the configuration of the transmission node. In the case of the relay node, other than the configuration shown in FIG. 10, the reception use interface is further included. FIG. 11 shows an example of the configuration of the relay node. As illustrated, a relay node 200 includes a relay entity 210, an input interface 220, and an output interface 230.

The input interface 220 receives a packet PD1 from the network. The relay entity 210 decides whether or not the related packet is bandwidth guaranteed in accordance with the packet identifier comprised by predetermined information of the packet header of the received packet PD1 and transmits the data as a packet PD2 to the network via the output interface 230 in accordance with the result of the decision. Note that, in the packet transfer in the relay node 200, the packet transfer is carried out in the set bandwidth in the case of the communication to be bandwidth guaranteed, while the packet transfer is carried out in accordance with the state of communication etc. of the network in the case of communication not bandwidth guaranteed. Further, when transmitting the packet PD2, the relay entity 210 rewrites the packet header according to need.

In the present embodiment, the packet identifier is comprised by the specific information existing in each packet header. For example, in a network employing a TCP/IP protocol, the packet identifier is comprised by a combination of part or all of the IP addresses of the transmitter side and receiver side indicated in the packet header, protocol number, transmission and reception port numbers, and other fields.

In the present embodiment, the case is considered where for example a TCP or UDP is employed as the protocol of the packet network communication.

Figure 12:
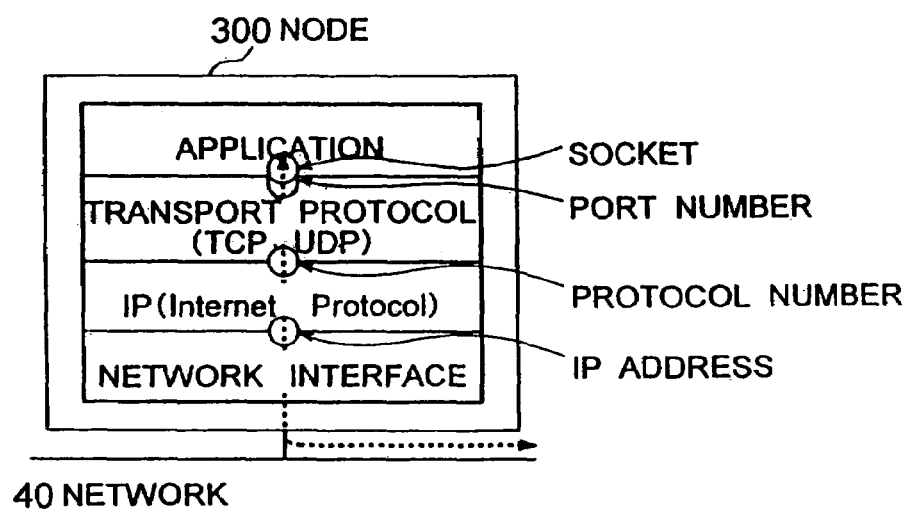
FIG. 12 is a view of information determined in communication nodes by a TCP/IP protocol.

FIG. 12 shows information determined in a certain communication node 300 by the TCP/IP protocol. Here, the related communication node 300 may be any of a transmission node, relay node, or reception node. As illustrated, an Internet protocol (IP) assigns an unique IP address to the network interface of each host as an entire network. Further, it assigns a protocol number to the interface with the transport protocol. The transport protocol utilizes a unique port number on the host with respect to an interface with an application, for example an input/output interface equipped with a buffer referred to as a socket. The application communicates with the process on the other host through this interface.

Figure 13:
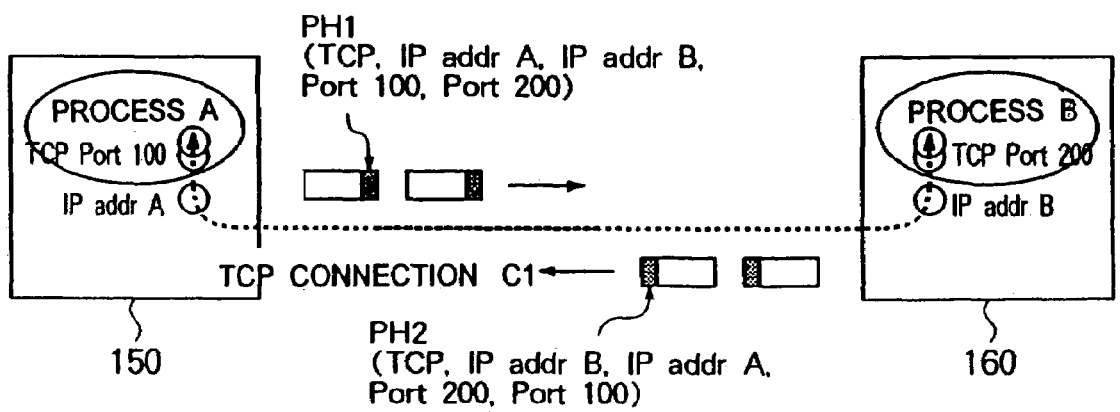
FIG. 13 is a conceptual view of packet communication according to a TCP protocol in a communication system comprising a transmission node and a reception node.

FIG. 13 is a conceptual view of packet communication interposing a TCP connection C1 between a process A existing at a node 150 and a process B existing at a node 160. As illustrated, the process A at the node 150 performs packet communication via a port number 100 and an IP address A. Contrary to this, the process B at the node 160 performs packet communication via a port number 200 and an IP address B.

For example, in a case of a connection-oriented transport protocol such as TCP, the socket has a TCP connection, that is, is connected to sets of local and peer IP addresses and port numbers. Accordingly, the data output to this socket describes the sets of local and peer IP addresses and port numbers indicating this TCP connection.

As shown in FIG. 13, each packet generated by the process A of the node 150 and transferred addressed to the process B of the node 160 has a packet header PH1 added to it. The packet header PH1 contains a protocol number (for example, information indicating either of the TCP or UDP, but TCP in this case), a transmitter side IP address (IP addrA), a receiver side IP address (IP addrB), a transmitter side port number (Port100), and a receiver side port number (Port200). In almost the same way, each packet generated by the process B and transferred addressed to the process A of the node 150 has a packet header PH2 added to it. The packet header PH2 contains a protocol number (TCP in this case), a transmitter side IP address (IP addrB), a receiver side IP address (IP addrA), a transmitter side port number (Port200), and a receiver side port number (Port100).

Further, in the case of a connectionless transport protocol such as UDP, the socket is connected to the local IP address and the port number. Then, when outputting data to the socket, the IP address and the port number of the destination of the transmission of that data are designated. The packet header added to this data describes the local IP address and port number connected to the socket and the designated peer IP address and port number.

Figure 14:
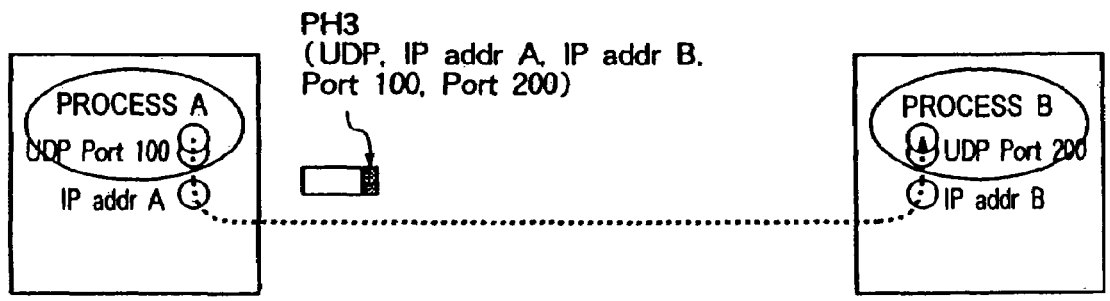
FIG. 14 is a conceptual view of packet communication according to a UDP protocol in a communication system comprising a transmission node and a reception node.

FIG. 14 shows a case where packet transfer is carried out from the process A of the node 150 to the process B of the node 160 based on the UDP protocol. As illustrated, each packet generated by the process A at the node 150 and transferred addressed to the process B at the node 160 has a packet header PH3 added to it. The packet header PH3 contains the protocol number (UDP in this case), transmitter side IP address (IP addrA), receiver side IP address (IP addrB), transmitter side port number (Port100), and the receiver side port number (Port200).

In the present embodiment, the transmission packets generated by the process are classified into packets to be bandwidth guaranteed and the packets not to be bandwidth guaranteed so as to realize the minimum bandwidth guarantee.

Figure 15:
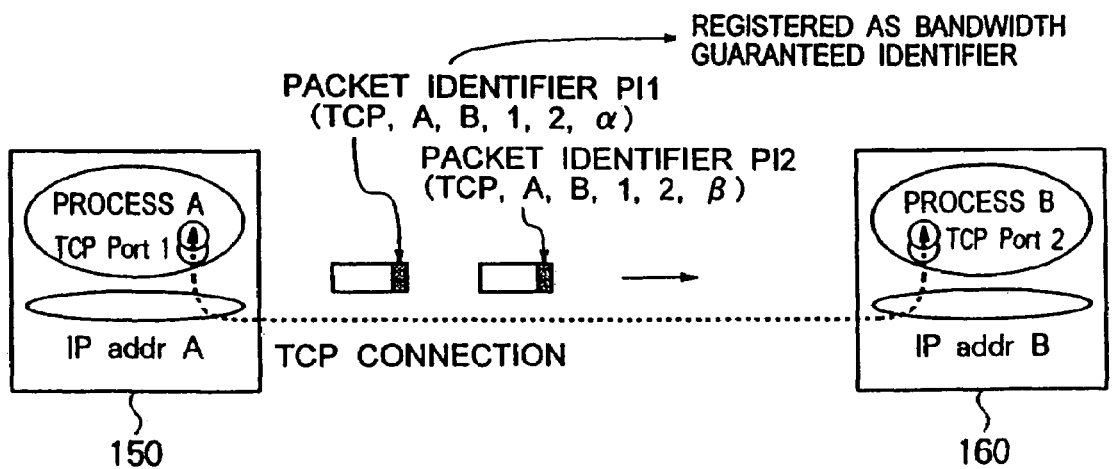
FIG. 15 is a view of a first embodiment of the communication system of the present invention.

FIG. 15 is a view of an embodiment of a communication system using the transmitter of the present invention. It is a conceptual view of a packet communication system for realizing a minimum bandwidth guarantee by one flow. As illustrated, the packet generated by the process A at the node 150 serving as the transmitter passes through the TCP connection C1 and is transferred to the process B at the node 160 serving as the reception node. The packets transferred contain different packet identifiers. Namely, a packet identifier PI1 is added to a packet to be bandwidth guaranteed, while a packet identifier PI2 is added to a packet not to be bandwidth guaranteed.

The packet identifier PI1 added to the packet to be bandwidth guaranteed contains, other than the protocol number (TCP), transmitter side IP address (A), receiver side IP address (B), transmitter side port number (1), and the receiver side port number (2), information data $\alpha$ indicating the bandwidth is guaranteed. The information data $\alpha$ is displayed by using for example a type of service (TOS) field of the packet header.

On the other hand, the packet identifier PI2 added to the packet not to be bandwidth guaranteed, that is, a packet that exceeds the guaranteed bandwidth, contains, other than the protocol number (TCP), transmitter side IP address (A), receiver side IP address (B), transmitter side port number (1), and the receiver side port number (2), information data $\beta$ indicating that the bandwidth is not guaranteed. The information data $\beta$ is displayed by using for example the TOS field of the packet header.

Figure 16:
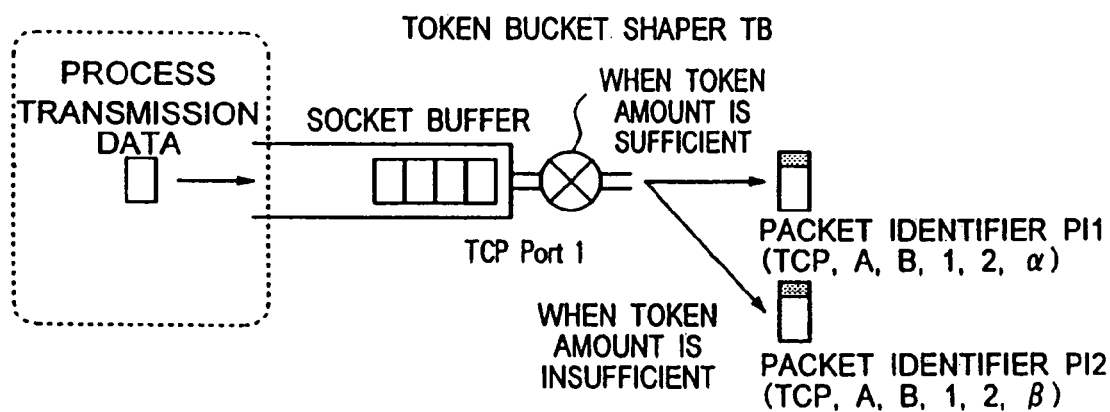
FIG. 16 is a conceptual view of an operation of the transmission node of the communication system shown in FIG. 15.

FIG. 16 is a conceptual view of an example of the operation in a case where packet transfer with a bandwidth guarantee is carried out by using a token bucket shaper TB. As illustrated, the transmission data generated by the process A is for example divided into predetermined amounts to generate the packet data. The generated packet data is stored in the socket buffer of the TCP connection and transmitted in the set bandwidth, for example, at the transfer speed to the network by the token bucket. In this case, the amount of generation of the tokens is set to be the same value as the set guaranteed bandwidth. Further, the packet size is set at the same value as the socket buffer.

Figure 17:
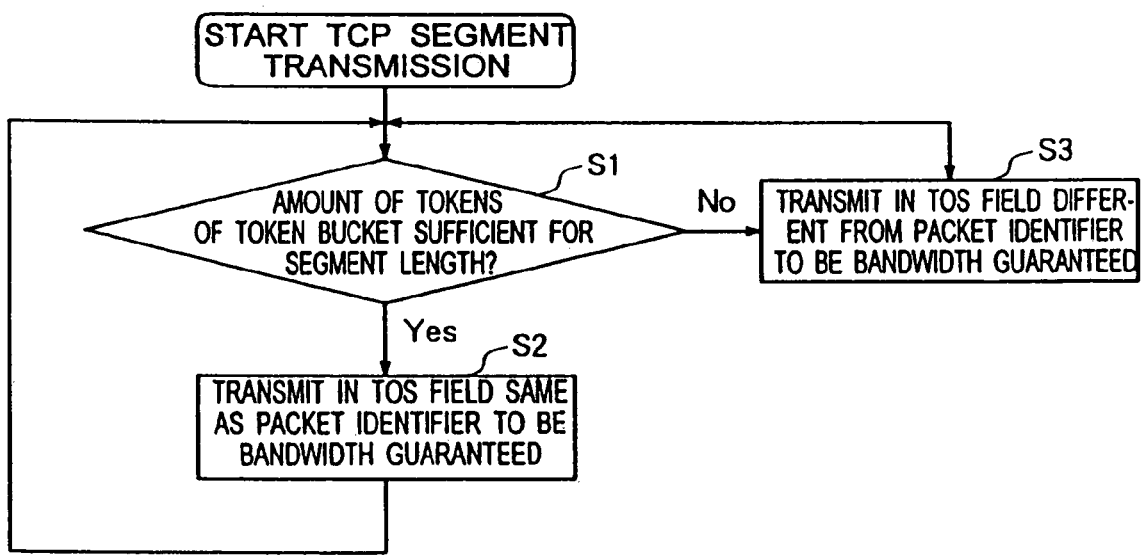
FIG. 17 is a flowchart of the operation of the transmission node shown in FIG. 16.

FIG. 17 is a flowchart of the operation of packet transmission using the token bucket shaper shown in FIG. 16. Below, an explanation will be made of the operation of packet communication by referring to FIG. 16 and FIG. 17.

In the TCP protocol, when data is taken out from the socket buffer and transmitted, tokens of the amount of a segment (divided transmission data) length to be transmitted from the token bucket are consumed. At step S1, it is judged whether or not the amount of tokens of the token bucket is sufficient for the segment length. When the result of the decision is that the amount of tokens of the token bucket is sufficient for the segment length, the processing of step S2 is carried out and the value the same as the value registered at the time of setting the bandwidth guarantee, for example, in the information data $\alpha$ shown in FIG. 15 is written into the TOS field of the IP header of the segment. Namely, as shown in FIG. 16, the packet identifier PI1 indicating a bandwidth guarantee is added to the packet data and transmitted to the network.

On the other hand, when the result of the decision at step S1 is that the amount of tokens of the token bucket is insufficient for the segment length, that is, when the amount of the token bucket does not reach the segment length, the processing of step S3 is carried out and a value different from the value registered at the time of setting the bandwidth guarantee, for example, in the information data β shown in FIG. 15 is written. Namely, as shown in FIG. 16, the packet identifier PI2 indicating that the bandwidth guarantee is not set is added to the packet data and transmitted to the network.

The transfer of the packet data was explained by defining the node 150 mentioned above as the transmission node, but the node 150 is not limited to a transmission node, but may be for example a relay node. In this case, the transmission packet data input to the socket buffer of the node 150 is not the transmission data generated by the process provided in the related node 150, but for example the packet data sent from the transmission node or the relay node of the previous stage. In the node 150, the received packet data is stored once in the buffer, then transmitted to the relay node or the reception node of the next stage by a similar procedure to that of the above, for example, via the token bucket shaper in the buffer set therefor. When transmitting the packet, in accordance with the result of comparison of the segment length and the amount of tokens of the transmission data, different packet identifiers, that is, the packet identifier PI1 to be bandwidth guaranteed and the packet identifier PI2 not to be bandwidth guaranteed, are added to the packet data.

As mentioned above, according to the present embodiment, when packet communication is carried out by using one flow, based on the result of comparison between the segment length of the transmission data and the amount of tokens of the token bucket, either of a packet identifier PI1 to be bandwidth guaranteed or a packet identifier PI2 not to be bandwidth guaranteed is added to the packet data to be transmitted and transmitted to the network.

In this way, by selectively using a plurality of packet identifiers, even in a case where there is a relay node performing some kind of processing on the route concerning such a packet transfer that exceeds the set bandwidth on the communication route, the minimum bandwidth guarantee can be realized. Further, by the selective use of the identifiers, it can be decided on the receiver side whether that packet was transferred as a bandwidth guaranteed packet or transferred as a bandwidth unguaranteed packet. By feeding back this information to the transmitter side, a round trip time (RTT) or loss rate of the route of the bandwidth unguaranteed packet can be detected. This can be utilized as control information of packet communication more than the set bandwidth.

Second Embodiment

Figure 18:
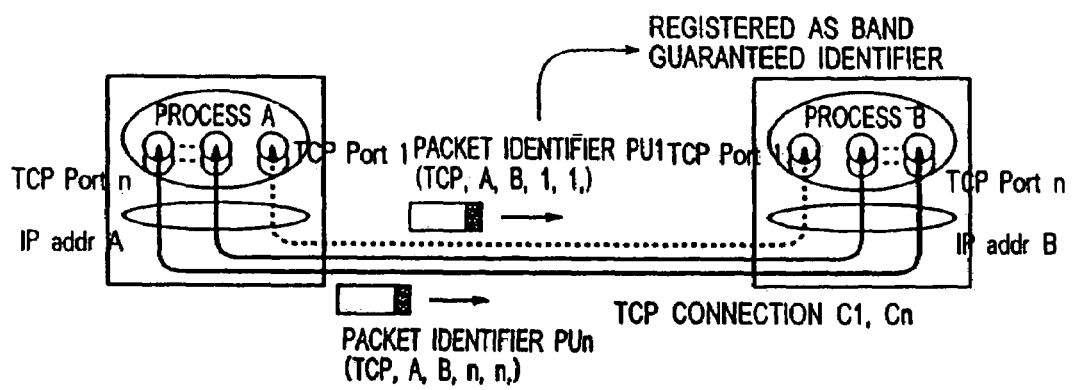
FIG. 18 is a view of a second embodiment of the communication system of the present invention.

FIG. 18 is a view of the configuration of a second embodiment of the communication system according to the present invention.

As illustrated, in the communication system of the present embodiment, the packets generated by the process A at the node 150 are transferred to the reception node 160 via a plurality of flows, for example, TCP connections C1 to Cn (n is a natural number and n>1).

In the plurality of flows, packet transfer in one or a plurality of flows is bandwidth guaranteed, while packet transfer in the flows other than them is not bandwidth guaranteed. Here, as an example, the bandwidth is guaranteed for packet transfer in for example the TCP connections C1 and C2, but the bandwidth is not guaranteed for packet transfer in the TCP connections C3, . . . , and Cn other than them.

In the communication system of the present embodiment, it is assumed that one-to-one communication is carried out, that is, so-called uni-cast communication is carried out between the nodes, for example, between the process A and the process B at the transmission node 150 and the reception node 160.

As shown in FIG. 18, packet identifiers PU1 to PUn are added to the packets to be transferred via the TCP connections C1 to Cn. Each packet identifier contains the local and peer IP address and port number linked with each socket. For example, the packet identifier PU1 contains the protocol number (TCP), transmitter side IP address (A), receiver side IP address (B), transmitter side port number (1), and the receiver side port number (1), while the packet identifier PUn contains the protocol number (TCP), transmitter side IP address (A), receiver side IP address (B), transmitter side port number (n), and the receiver side port number (n).

Figure 19:
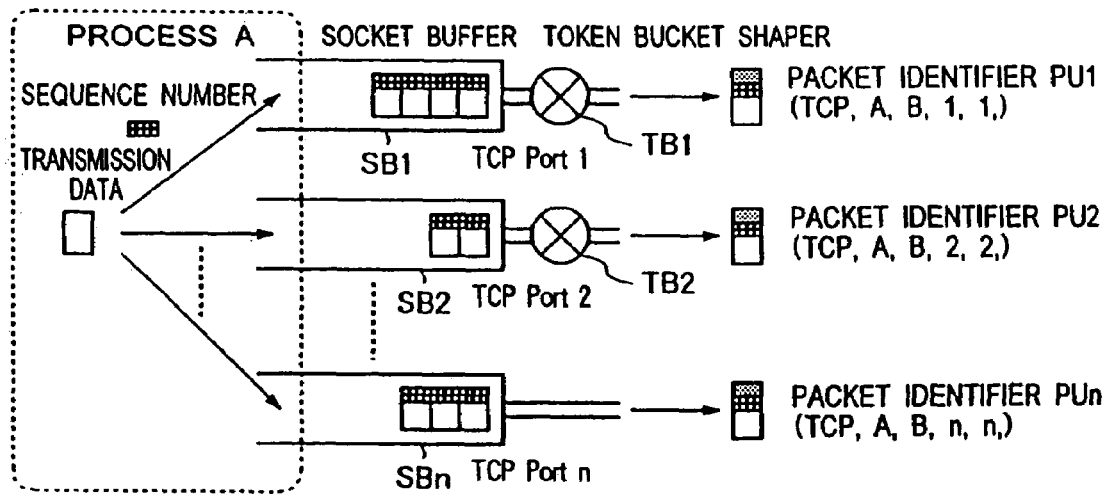
FIG. 19 is a conceptual view of the operation of the transmission node of the communication system shown in FIG. 18.

FIG. 19 illustrates packet communication in a case where the bandwidth is guaranteed for C1 and C2 in packet communication of n number of TCP connections C1 to Cn, but the bandwidth is not guaranteed for packet communication other than this. Before performing the packet communication, the packet identifier of the communication to be bandwidth guaranteed and that requested guaranteed bandwidth are registered. For example, in the case shown in FIG. 19, the packet identifiers PU1 and PU2 of the packet transfer in the TCP connections C1 and C2 to be bandwidth guaranteed are registered. The packet transfer in TCP connections other than these is not to be bandwidth guaranteed, therefore their packet identifiers are not registered.

As illustrated, the packet data generated by the process A is input to socket buffers SB1, SB2, . . . , and SBn. Further, sequence numbers are given to the packet data. The packet data stored in the socket buffers SB1 and SB2 are transmitted to the network by the token bucket shapers TB1 and TB2 in the predetermined bandwidth, that is, at the transfer speed. In this case, the amount of generation of the token bucket is controlled in accordance with the set bandwidth. Further, the size of the token bucket is set similar to the size of the socket buffer.

On the other hand, the other packet data not to be bandwidth guaranteed is directly transmitted to the network without going through the token bucket shaper.

Figure 20:
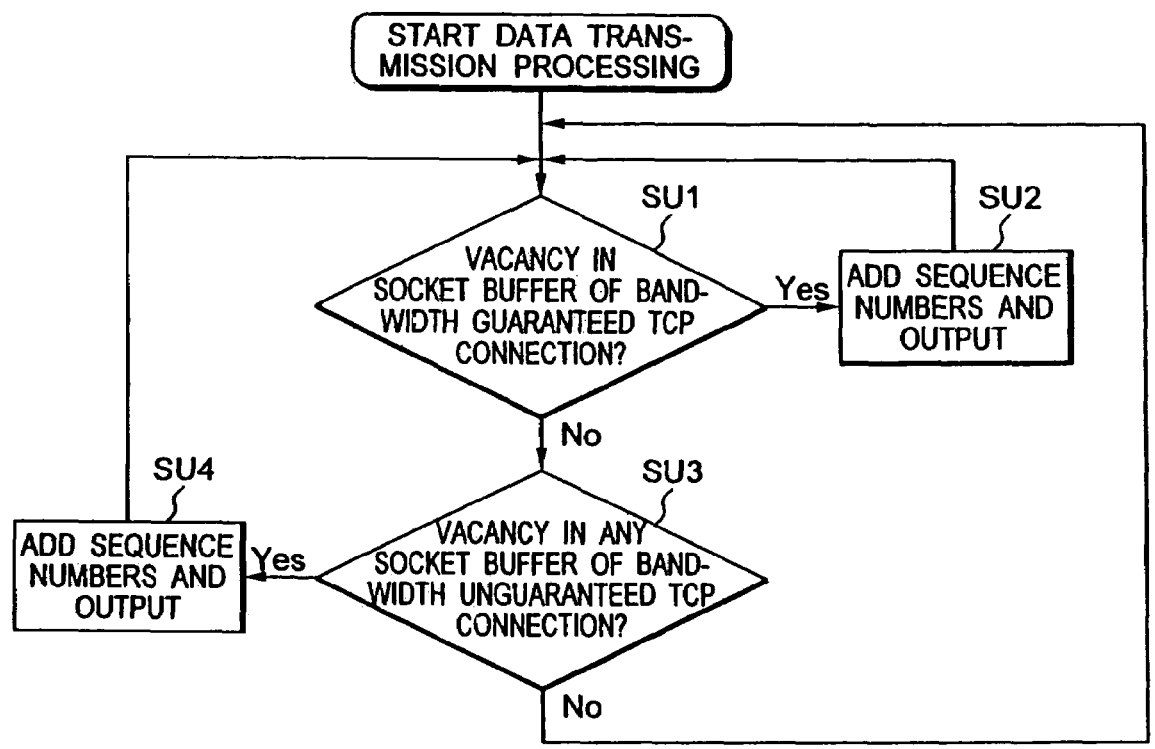
FIG. 20 is a flowchart of the operation of the transmission node shown in FIG. 19.

FIG. 20 is a flowchart of the packet communication operation shown in FIG. 19. As illustrated, the TCP protocol consumes the amount of tokens of the segment length transmitted from the token bucket when taking out the data from the socket buffers and transmitting the same.

First, at step SU1, it is decided whether or not there is a vacancy in the socket buffer of the bandwidth guaranteed TCP connection. When there is a vacancy, the processing shown in step SU2 is carried out and the sequence numbers are added to the packet data and input to the socket buffer. On the other hand, when it is decided that there is no vacancy, the processing shown in step SU3 is carried out to decide whether or not there is a vacancy in either socket buffer of the bandwidth unguaranteed TCP connection. When there is a vacancy, the processing of step SU4 is carried out and the sequence numbers are added to the packet data and input to the socket buffer. On the other hand, when there is no vacancy, the routine returns to step SU1, where the above professing are repeated.

Namely, by the process A, the state of vacancy of each socket buffer connected to each TCP connection is monitored. When there is a vacancy in any socket buffer, the transmission packet data is input to that socket buffer. When there is a vacancy in a plurality of socket buffers, the packet data is output with a high priority to the socket buffer of the bandwidth guaranteed TCP connection. At the time of data output, the sequence numbers are added, so the packet identifiers and the sequence numbers are added to the packets sent to the network. For this reason, the receiver side can reconstruct the original order of the received data and reproduce the transmission data based on the sequence numbers contained in the packet data arriving at the plurality of reception use socket buffers.

Note that the node 150 mentioned above is not limited to a transmission node, but may be for example a relay node too. When the node 150 is a relay node, the packet data input to each socket buffer is not generated by the process A, but the packet data transmitted from the transmission node or other relay node existing in the front stage. The relay node decides whether or not the packet is a bandwidth guaranteed packet in accordance with the identifier of the received packet data. A bandwidth guaranteed packet is input to the predetermined buffer in accordance with the guaranteed bandwidth, but a bandwidth unguaranteed packet is input to a socket buffer in accordance with that. By this, the bandwidth guaranteed packets are sent to the network via the token bucket shaper in the guaranteed bandwidth, for example at the transfer speed, and the packets other than those are sent to the network without going through the token bucket shaper.

As explained above, according to the present embodiment, when packet communication is carried out between the transmission node 150 and the reception node 160 through a plurality of flows, for example, TCP connections, and one-to-one communication is carried out between the processes existing at the transmission node 150 and the reception node 160, when the bandwidth is guaranteed for packet communication in one or a plurality of flows among a plurality of flows, but the bandwidth is not guaranteed for packet communication in other flows, the packet identifiers and the guaranteed bandwidths of the flows to be bandwidth guaranteed are registered.

In packet communication, the process of the transmission node monitors the state of vacancy of the socket buffer connected to each flow and the outputs data with a high priority to the socket buffer corresponding to the bandwidth guaranteed flow.

Third Embodiment

Figure 21:
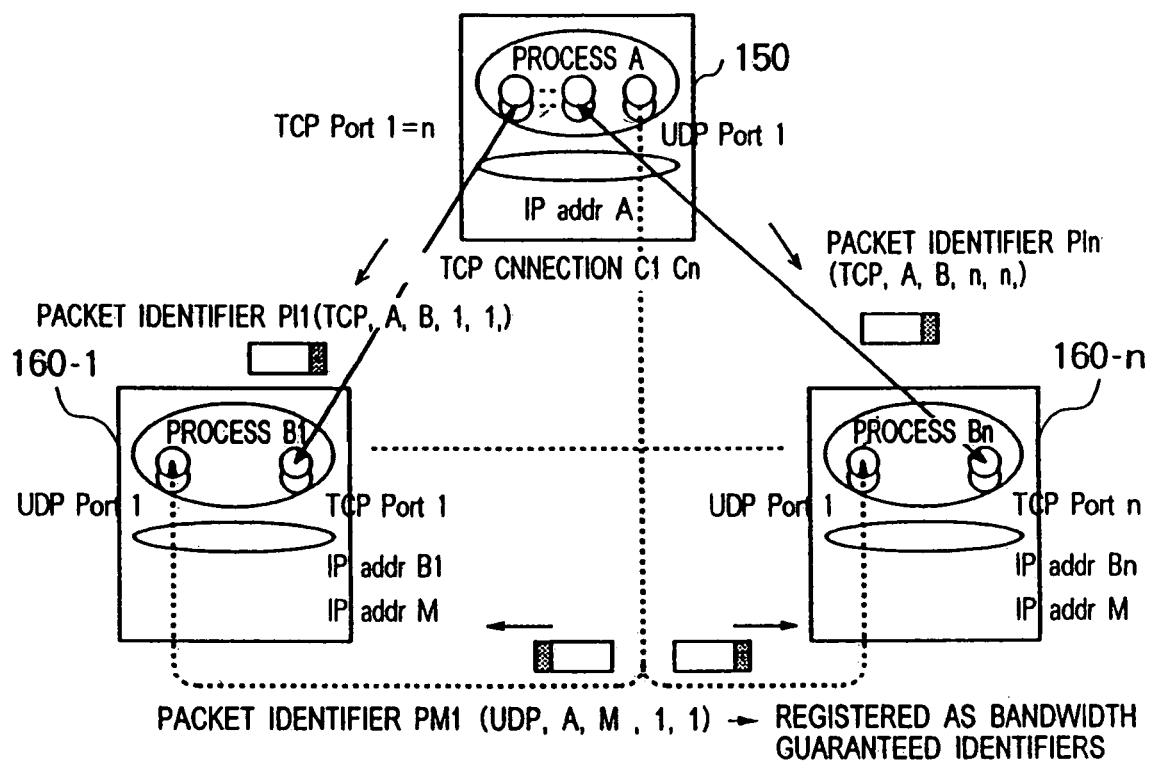
FIG. 21 is a view of a third embodiment of the communication system of the present invention.

FIG. 21 is a view of the configuration of a third embodiment of the communication system according to the present invention.

As illustrated, in the communication system of the present embodiment, the network guarantees the bandwidth for one-to-many communication, so-called multi-cast communication, among the processes existing on a plurality of hosts.

As illustrated, in the communication system of the present embodiment, the node 150 is provided with a TCP port for one-to-one communication and a UDP port for one-to-many communication. The one-to-one communication can be carried out between the node 150 and the nodes 160-1 to 160-n via the TCP port, while the node 150 communicate with respect to a plurality of nodes 160-1 to 160-n at one time via the UDP ports. Note that, in the present embodiment, it is assumed that the bandwidth is guaranteed with respect to one-to-many communication performed via the UDP ports.

As shown in FIG. 21, the process A existing at the node 150 performs one-to-one packet communication with the nodes 160-1 to 160-n via a plurality of TCP connections C1 to Cn. In this case, each packet has added to it an identifier containing the protocol number (TCP), transmitter side IP address (A), receiver side IP addresses (B1 to Bn), transmitter side port number (1) and receiver side port numbers (1 to n). For example, the packet transferred from the node 150 to the node 160-1 has added to it the identifier PI1 containing the protocol number (TCP), transmitter side IP address (A), receiver side IP address (B1), transmitter side port number (1), and the receiver side port number (1), while the packet transferred from the node 150 to the node 160-n has added to it the identifier PIn containing the protocol number (TCP), transmitter side IP address (A), receiver side IP address (Bn), transmitter side port number (1), and the receiver side port number (n).

The node 150 performs packet communication with respect to the nodes 160-1 to 160-n via the UDP ports. As illustrated, the nodes 160-1 to 160-n are assigned, other than the IP addresses B1 to Bn, IP addresses M for multi-cast communication. In multi-cast communication, the transmission packet of the node 150 has added to it an identifier PM1 containing the protocol number (UDP), transmitter side IP address (A), a receiver side multi-cast IP address (M), transmitter side port number (1), and receiver side port number (1) and is transmitted to the network.

As mentioned above, in the present embodiment, the bandwidth is guaranteed for the multi-cast communication between the node 150 and the nodes 160-1 to 160-n. For this reason, at the time of multi-cast communication, the packet identifier PM1 added to the packet data and the guaranteed bandwidth thereof are registered in advance. The packet identifiers other than that, for example, the packet identifiers PI1 to PIn, are not registered. When packet communication is carried out between the node 150 and the nodes 160-1 to 160-n, packet transfer is carried out with respect to the packets of the multi-cast communication in the set guaranteed bandwidth. The bandwidth is not guaranteed for packet communication carried out between the packet 150 and the nodes 160-1 to 160-n via the TCP connection.

Figure 22:
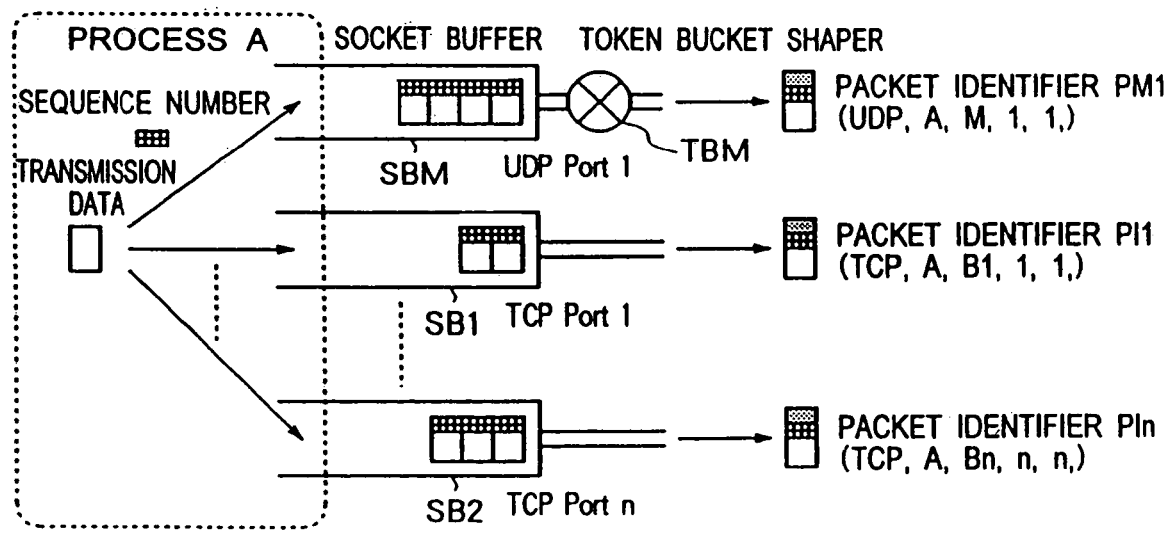
FIG. 22 is a conceptual view of the operation of the transmission node of the communication system shown in FIG. 21.

FIG. 22 is a conceptual view of packet communication at the node 150 of the present embodiment. As illustrated, the process A on the node 150 inputs the transmission data to be subjected to the multi-cast communication to a socket buffer SBM corresponding to that. The transmission data of the packet communication through the TCP connection is input to the socket buffers SB1 to SBn corresponding to the destinations of the transfer.

The transmission data stored in the socket buffer SBM is sent to the network via a token bucket shaper TBM. The token bucket shaper TBM receives as input the tokens generated in accordance with the guaranteed bandwidth set in advance, so the bandwidth of the packet sent to the network is guaranteed by the token bucket shaper TBM.

Figure 23:
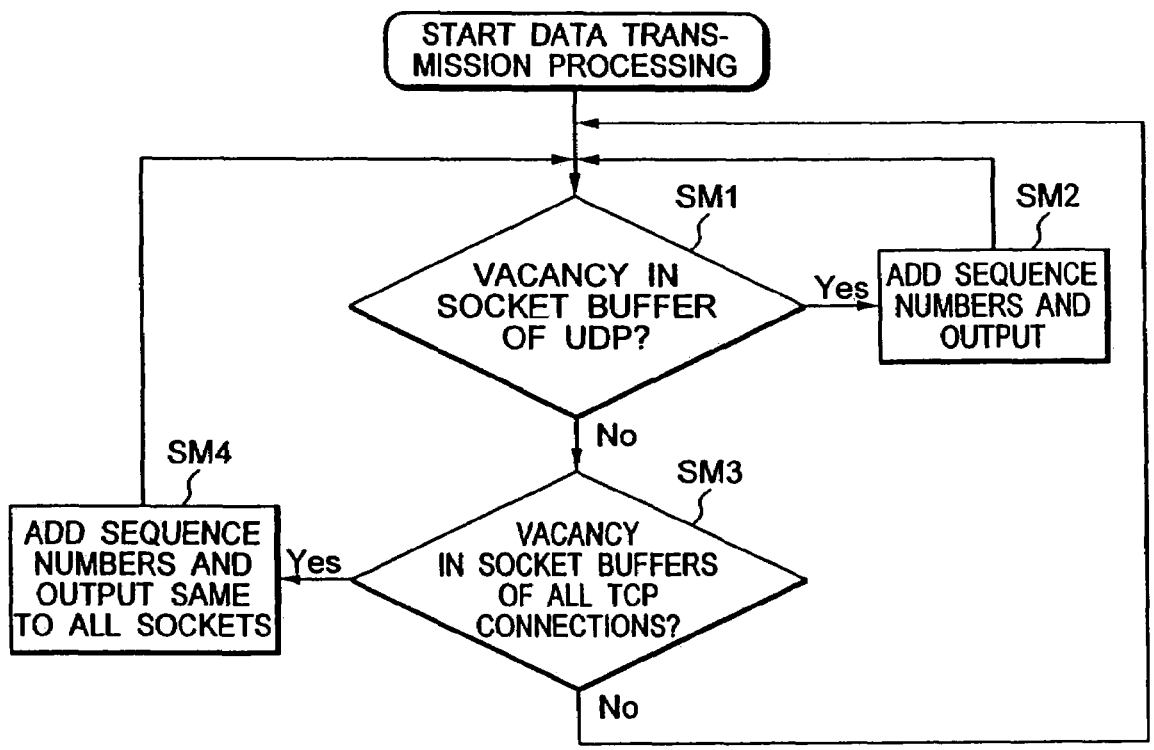
FIG. 23 is a flowchart of the operation of the transmission node shown in FIG. 22.

FIG. 23 is a flowchart of the operation of the packet transfer of the process A at the node 150. Below, an explanation will be made of the procedure of packet transfer at the node 150 by referring to FIG. 23.

First, at step SM1, it is decided whether or not there is a vacancy in the UDP socket buffer SBM. When the result of the decision is that there is a vacancy in the socket buffer SBM, the processing shown in step SM2 is carried out and the sequence numbers are added to the packet data and output. On the other hand, when there is no vacancy in the socket buffer SBM, at step SM3, it is decided whether or not there is a vacancy in the socket buffers of all connections. When the result of the decision is that there is a vacancy in the socket buffers of all TCP connections, the sequence numbers are added to the transmission data and output to the socket buffers. When there is no vacancy in the socket buffers of all TCP connections, the routine returns to step SM1, where the above processing is repeated.

As mentioned above, the process A existing at the node 150 monitors the socket buffer of UDP and each socket buffer connected to the TCP connection. When there is a vacancy in the socket buffer of UDP, the transmission data is output to that socket. When there is no vacancy in the socket buffer of UDP and there is a vacancy in the socket buffers of all the other TCP connections, the same transmission data is output to the socket buffers of all TCP connections. Conversely, when there is no vacancy in the socket buffers of all TCP connections, the data is not transmitted, the vacancy of the socket buffer of the UDP mentioned above is decided, and the above professing are repeated.

The receiver side reconstructs the order of the packets and reproduces the original data based on the sequence numbers of the packet data arrived at the reception socket buffers.

As explained above, according to the present embodiment, the process A at the node 150 guarantees the bandwidth for multi-cast communication, but does not guarantee the bandwidth for communication going through other TCP connections. The packet identifiers and the guaranteed bandwidths of the packet communications to be bandwidth guaranteed are registered in advance. At the time of packet communication, the transmission packets of the multi-cast communication are transferred in the set bandwidth, and the transmission packets other than them are transferred in accordance with the communication situation etc. of the network.

In this way, by registering the packet identifiers and their guaranteed bandwidths of the communications to be bandwidth guaranteed in advance by using a plurality of packet identifiers, the set minimum bandwidth guarantee can be realized even if there is a node performing some sort of processing on the circuit concerning the packet transfer.

Fourth Embodiment

Figure 24:
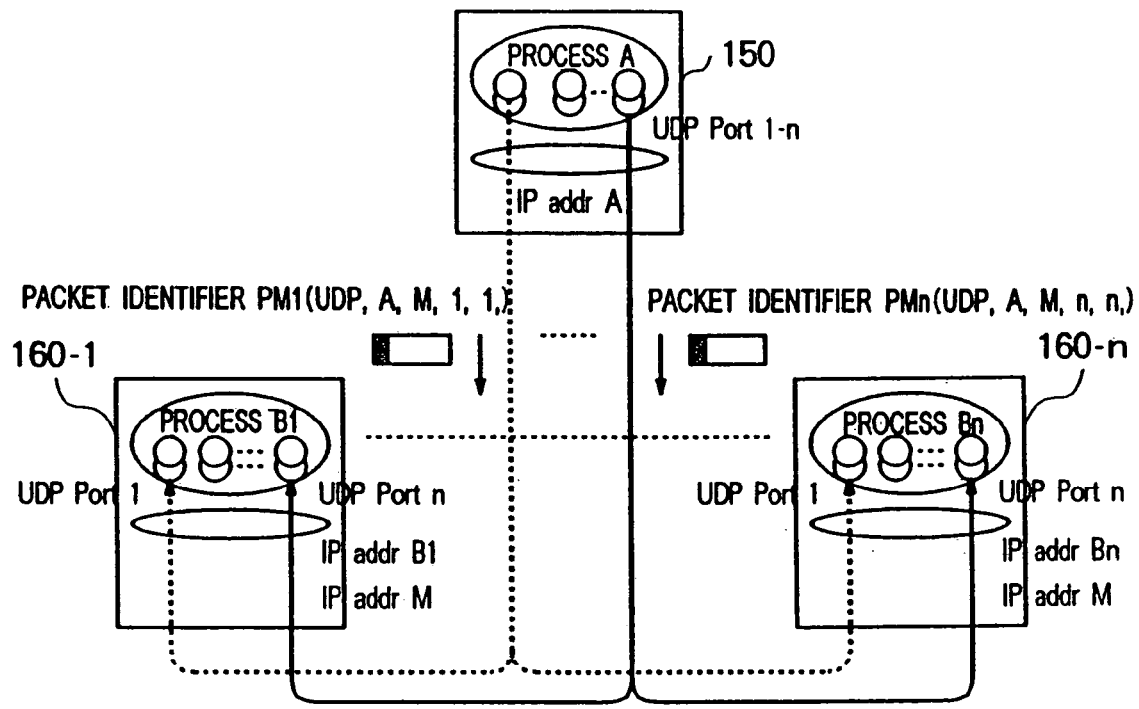
FIG. 24 is a view of a fourth embodiment of the communication system of the present invention.

FIG. 24 is a view of the configuration of a fourth embodiment of the communication system according to the present invention. In the communication system of the present embodiment, when the network performs one-to-plural communication, so-called, multi-cast communication, among processes existing on a plurality of hosts a plurality of number of times, the bandwidth is guaranteed for one or more multi-cast communications among them.

As illustrated, in the communication system of the present embodiment, n UDP ports for performing the one-to-many communication are provided at the node 150. Further, n UDP ports for performing the multi-cast communication are provided at the nodes 160-1 to 160-n. The multi-cast communication is carried out between the node 150 and the nodes 160-1 to 160-n via the UDP ports. Note that, in the present embodiment, it is assumed that one or a plurality of bandwidth guarantees is carried out with respect to the one-to-many communication performed via the UDP ports.

As illustrated, the nodes 160-1 to 160-n are assigned, other than the IP addresses B1 to Bn, IP addresses M for multi-cast communication. In multi-cast communication, the transmission packets of the node 150 have added to them packet identifiers PM1 to PMn containing the protocol number (UDP), transmitter side IP address (A), receiver side multi-cast IP address (M), transmitter side port numbers (1 to n), and the receiver side port numbers (1 to n) and are transmitted to the network. The packet identifiers and guaranteed bandwidths of the communication packets to be bandwidth guaranteed are registered in advance for these packet identifiers.

Figure 25:
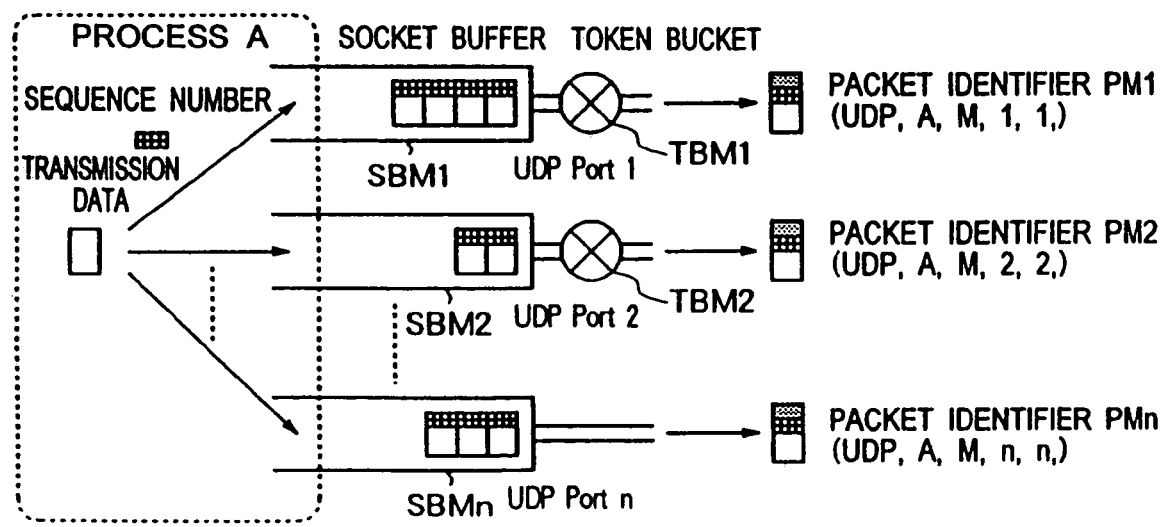
FIG. 25 is a conceptual view of the operation of the transmission node of the communication system shown in FIG. 22.

FIG. 25 is a conceptual view of packet communication at the node 150 of the present embodiment. As illustrated, the process A at the node 150 generates the transmission data to be subjected to multi-cast communication and inputs the same to socket buffers SBM1, SBM2, . . . , and SBMn.

Here, it is assumed that the bandwidth is guaranteed for the packet data stored in the socket buffers SBM1 and SBM2, but the bandwidth is not guaranteed for the packet data stored in the other socket buffers. As illustrated, the packet data stored in the socket buffer SBM1 is transmitted via a token bucket shaper TBM1 to the network in the set bandwidth. Similarly, the packet data stored in the socket buffer SBM2 is transmitted via a token bucket shaper TBM2 to the network in the set bandwidth. The packet data stored in the socket buffers other than the socket buffers TBM1 and TBM2 is transmitted to the network without going through the token bucket shaper. The packet identifiers PM1, PM2, . . . , and PMn are added to the packet data transferred from the socket buffers.

Figure 26:
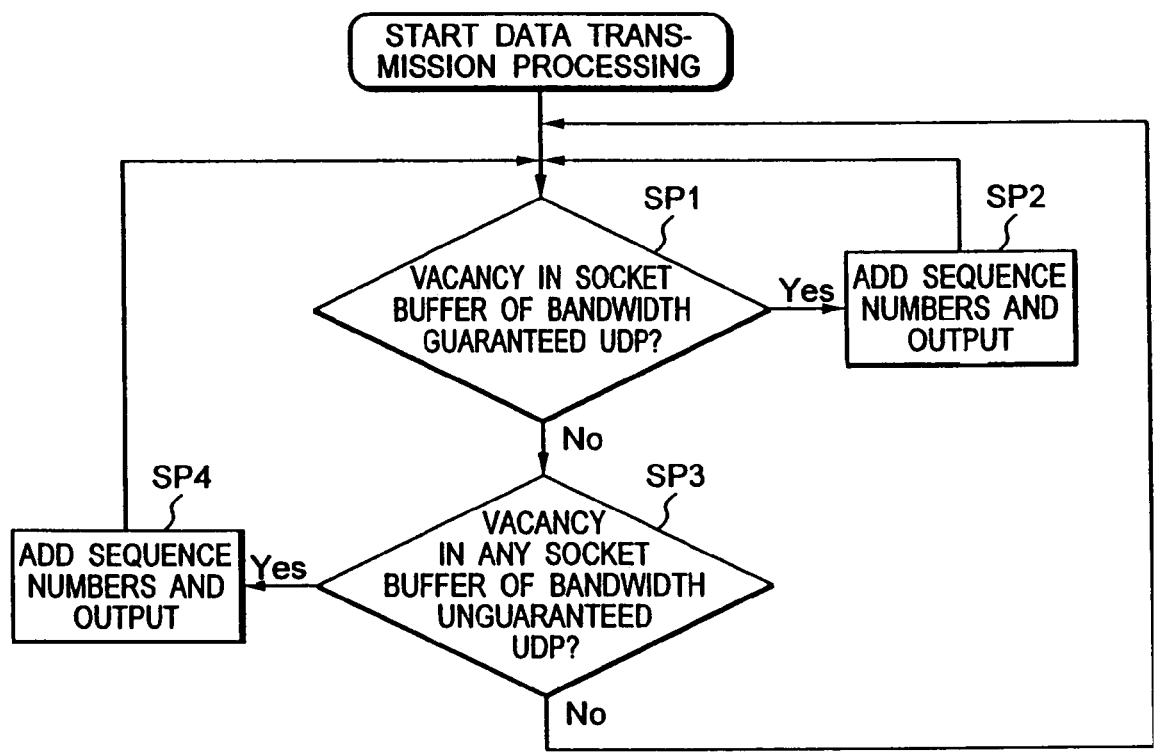
FIG. 26 is a flowchart of the operation of the transmission node shown in FIG. 25.

FIG. 26 is a flowchart of the operation of the packet transfer of the process A at the node 150. Below, an explanation will be made of the procedure of the packet transfer at the node 150 by referring to FIG. 26.

First, at step SP1, it is decided whether or not there is a vacancy in the socket buffer of the bandwidth guaranteed UDP. When there is a vacancy, the processing shown in the step SP2 is carried out and the sequence numbers are added to the packet data and input to the socket buffer. On the other hand, when it is decided that there is no vacancy, the processing shown in step SP3 is carried out, where it is decided whether or not there is a vacancy in the socket buffer of the bandwidth unguaranteed UDP. When there is a vacancy, the processing of step SP4 is carried out and the sequence numbers are added to the packet data and input to the socket buffer. On the other hand, when there is no vacancy, the routine returns to step SP1, where the above processing is repeated.

Namely, the process A monitors the state of vacancy of the socket buffer connected to each UDP. When there is a vacancy in any socket buffer, the transmission packet data are output to that socket buffer. When there is a vacancy in a plurality of socket buffers, the packet data is output with a high priority to the socket buffer of the bandwidth guaranteed UDP. At the time of data output, the sequence numbers are added, so the packet identifiers and the sequence numbers are added to the packets transmitted to the network. For this reason, the receiver side can reproduce the received data by the original order based on the sequence numbers contained in the headers of the packets arriving at the plurality of reception use socket buffers.

As explained above, according to the present embodiment, the node 150 performs multi-cast communication with the nodes 160-1 to 160-n via a plurality of UDP ports. The packet identifiers and guaranteed bandwidths of the packet communications to be bandwidth guaranteed among a plurality of multi-cast communications are registered in advance, the packets of the packet communications to be bandwidth guaranteed at the time of packet communication are transferred in the set bandwidth, and the other packets are transferred in accordance with the state of communication etc. of the network.

In this way, by registering the packet identifiers and their guaranteed bandwidths of the communications to be bandwidth guaranteed in advance by using a plurality of packet identifiers, the set minimum bandwidth guarantee can be realized with respect to the registered packet communication.

Summarizing the effect of the present invention, the invention can be applied to a communication network for simultaneously performing a plurality of communications, i.e., stream data communication wherein the data generated per unit time at the transmitter side must be transferred at a constant speed, for example, communication wherein continuous media such as video and audio accompanied by a real time property must be transferred at the constant communication speed and data communication that transfers data stored on the transmitter side in a designated time, for example, communication wherein the transfer speed may be not less than the transfer speed in accordance with the designated time in the case of data file transfer.

As explained above, according to the transmitter of the present invention and the communication system configured by using the same, by registering packet identifiers and their guaranteed bandwidths of the communications to be bandwidth guaranteed in advance by using a plurality of packet identifiers, the minimum bandwidth guarantee can be realized even in a case where there is a communication node performing processing on the circuit concerning the packet transfer.

Further, by the selective use of the identifiers, it can be decided on the receiver side whether or not that packet was transferred as a bandwidth guaranteed packet or transferred as a bandwidth unguaranteed packet. By feeding back this information to the transmitter side, there are the advantages that the RTT or loss rate of the route of the bandwidth unguaranteed packet can be detected and the information can be utilized as control information concerning packet communication more than the set bandwidth.

While the invention has been described by reference to specific embodiments chosen for purposes of illustration, it should be apparent that numerous modifications could be made thereto by those skilled in the art without departing from the basic concept and scope of the invention.

What is claimed is:

1. A method of transferring packet data from a transmitter side to a receiver side via a network, comprising the steps of:
    deciding whether or not packet data is transmitted exceeding a guaranteed bandwidth based on a preset guaranteed bandwidth set in advance with respect to the packet data to be transferred and adding a first identifier to the packet data when the packet data is transmitted without exceeding the guaranteed bandwidth, while adding a second identifier to the packet data when the packet data is transmitted exceeding the guaranteed bandwidth;
    transmitting the packet data to which the identifier has been added to the network in the preset guaranteed bandwidth by using a token bucket shaper for the packet data to be transmitted without exceeding the preset guaranteed bandwidth;
    receiving at a relay unit packet data transferred via the network and further transferring the received packet data to the receiver side;
    selecting one or more relay units; and
    registering identifiers corresponding to packet data to be transferred without exceeding the preset guaranteed bandwidth and guaranteed bandwidths.

* * * * *